United States Patent [19]

Casey et al.

[11] Patent Number: 5,068,265
[45] Date of Patent: Nov. 26, 1991

[54] SEALANT COMPOSITION

[75] Inventors: Tadhg E. Casey; David P. Melody, both of Dublin, Ireland

[73] Assignee: Loctite (Ireland) Ltd., Dublin, Ireland

[21] Appl. No.: 384,230

[22] Filed: Jul. 21, 1989

[30] Foreign Application Priority Data

Jul. 21, 1988 [IE] Ireland ................................. 2227/88

[51] Int. Cl.$^5$ ................................. C09J 4/02
[52] U.S. Cl. ................................. 523/176; 524/533; 524/538; 525/304; 525/309; 525/420
[58] Field of Search ................ 523/176; 524/533, 538; 525/305, 426, 304, 309, 420; 521/54

[56] References Cited

U.S. PATENT DOCUMENTS

| 4,318,959 | 3/1982 | Evans et al. | 428/364 |
| 4,331,580 | 5/1982 | Bunyan | 523/176 |
| 4,439,561 | 3/1984 | Barber | 524/13 |
| 4,452,944 | 6/1984 | Dawdy | 523/176 |

FOREIGN PATENT DOCUMENTS 1422439 1/1976 United Kingdom .

OTHER PUBLICATIONS

Frances et al., "Aramid Pulp Shows Promise as High Performance Thixotrope", *Adhesive Age*, Apr. 1988, pp. 27–30.

*Primary Examiner*—Joseph L. Schofer
*Assistant Examiner*—R. H. Delmendo
*Attorney, Agent, or Firm*—Edward K. Welch, II; Eugene F. Miller

[57] ABSTRACT

An anaerobic liquid acrylate sealant composition contains short portions of one or more types of fibre, particularly aramid fibre pulp, as a filler. A particulate filler such as fumed silica and/or micronized polyethylene may also be present. The composition suitably is based on a high proportion of monofunctional acrylate ester monomer, and a polyacrylate plasticiser. The composition is used for sealing joints in pipework where it is desired to seal the joint almost immediately but to allow adjustment of the joint for at least 24 hours.

18 Claims, No Drawings

SEALANT COMPOSITION

BACKGROUND OF THE INVENTION

1) Field of the Invention

This invention relates to sealant compositions, particularly for sealing joints. It is particularly concerned with anaerobic sealant compositions used in sealing joints in pipework and other fluid conduits, particularly joints between interfitting male and female co-axial components, especially threaded components.

2) Description of the Prior Art

Plumbers currently use a variety of sealants for sealing joints in pipework. The traditional form of sealant is a combination of a hemp cord (which is laid in the helical thread of one component) and a linseed oil formulation known as "bosswhite." This involves an undesirable amount of manual labour. Anaerobic acrylic resin compositions, which cure spontaneously when oxygen is excluded as a result of assemble of interfitting components, are commercially available as pipe sealants, but they are sometimes criticised on the ground that the composition does not provide a leak-proof seal in a short enough time. Plumbers wish to be able to test a joint in pipework under pressure immediately after interfitting of the components.

Modification of the sealant composition to reduce the cure time is generally not acceptable because a plumber needs to be able to adjust the relative angular position of two components by as much as 45° for some time, at least 24 hours after assembly of the components without breaking the seal. It is desirable therefore that the sealant composition should seal the joint almost immediately but should not lock the joint, at least for 24 hours.

Particulate fillers have been added to such compositions but they tend to increase the viscosity of the composition to the extent that it is difficult to apply.

Aramid fibre pulp, such as that sold under the Trademark KEVLAR by E. I. Du Pont de Nemours & Co., has been described as thixotrope for sealants, adhesives and coatings (Frances et al, Adhesives Age, April 1988, 27–30) Frances et al of E. I. Du Pont de Nemours & Co. tested aramid fibre pulp in a number of adhesives and sealants including epoxy, neoprene, PVC, plastisol, asphalt, polybutadiene, polyurethane and silicone American Fillers & Abrasives Inc. of 14 Industrial Park Drive, Bangor, Mich. 49013, U.S.A. offers KEVLAR pulps for use in adhesives, sealants, coatings, etc. to give thixotropic properties at low addition levels (Adhesives & Sealants Newsletter, Mar. 14, 1988). However there is no teaching concerning the use of aramid fibre pulp in an anaerobic acrylate polymer composition, or of the effect of such pulp in achieving a rapid seal with an anaerobic joint sealing composition.

BRIEF SUMMARY OF THE INVENTION

The present invention provides an anaerobic liquid sealant composition which contains short portions of one or more types of fibre as a filler.

The short portions of fibre may be chopped fibres such as chopped aramid fibres, polyethylene fibres or carbon fibres. The fibres are preferably highly fibrillated. It is preferred to use polymeric fibre pulps, particularly aramid fibre pulps. As described by Frances et al, aramid fibre pulp comprises very short, highly fibrillated fibres produced by fracturing the crystalline structure of aramid fibres. The polymeric fibre may be of the kind described as "expanded" aramid or American Fillers and Abrasives, Inc. of Bangor, Mich. The fibrillated fibres have curled, branched and ribbon-like fibrils.

The composition should contain a quantity of the short fibre portions which is effective in achieving a rapid seal but which is not so great as to clog an application nozzle or to increase the viscosity of the composition to a level at which the composition becomes unmanageable and difficult to apply to components which are to be sealed. A composition viscosity in the range of about 50,000–500,000 mPa.s or cP is suitable. All viscosities mentioned in this specification and/or claims are measured on a Brookfield RVT Viscometer with spindle 7 at 2.5 r.p.m. and at a temperature of 25° C.

The fibres preferably constitute from about 0.1% to 5%, preferably about 0.2%–2%, more particularly about 0.25%–1.0%, by weight of the sealant composition. The fibres suitably have a diameter in the range from 1 to 100 micrometres, preferably 1–20, more particularly 12–15 micrometres, and a nominal average length in the range from 0.5 millimetres (preferably 1 mm, more particularly 1.5 mm) to 5 millimetres (preferably 4 mm, more particularly 2.5 mm). The fibre pulp preferably has a surface area of about 8–10m$^2$/gram and a bulk density of less than about 25 lb./ft.$^3$, preferably less than about 20 lb./ft.$^3$, and most preferably less than about 15 lb./ft.$^3$.

Short portions of organic and/or inorganic fibres other than aramid or carbon fibres may also be used. Mixtures of two or more types of fibre may be used. The fibres should be flexible and not brittle as to avoid or at least minimize break up in use. They must be compatible with the anaerobic monomers and with other ingredients in the composition. They must be acceptable for handling in accordance with recognised Health and Safety standards. For use on water pipelines, they should also be compatible with potable water.

It is believed that the incorporation of the fibres into the anaerobic sealant composition does not affect the curing behaviour of the composition. However it is believed that when pressure is applied to a joint immediately after initiation of curing of the composition, the leak paths which would otherwise develop through the composition are blocked by a bulking effect of the short fibre portions in the presence of liquid. This cannot be achieved by the use of particulate fillers alone. Therefore it is believed that the unexpected advantage achieved by the present invention is not based on a thixotropic effect of the short fibre portions but is related to their unique bulking effect. Resistance to "sag" or "slump" of the composition is not important whereas resistance to leaking of air under pressure shortly after initiation of curing of the anaerobic composition is crucial to the success of the invention.

It is however useful to include one or more particulate fillers in the composition, in addition to the short portions of fibre. Preferred fillers include fumed silica and/or micronized polyethylene. The particulate filler may suitably comprise from 1%–20%, preferably 7%–12% by weight of the sealant composition. The proportions of particulate filler and short fibre portions relative to one another should be chosen so as to achieve good flow characteristics and workability. Normally the quantity of particulate filler should be substantially greater than that of the short fibre portions, e.g. in a weight ratio of from 6:1 to 40:1, preferably from 12:1 to 25:1, more particularly about 20:1.

Anaerobic compositions are well known in the art and are generally based on polymerizable acrylate ester monomers. The term "acrylate" as used herein includes "methacrylate." At least a portion of the acrylate monomer may be a di- or other polyacrylate ester. Suitable polyacrylate ester monomers are di-, tri- and tetraethyleneglycol dimethacrylate; dipropyleneglycol dimethyacrylate; polyethyleneglycol dimethacrylate; polypropyleneglycol dimethyacrylate; di(pentamethyleneglycol), dimethacrylate, tetraethleneglycol diacrylate; tetraethyleneglycol di(chloracrylate); diglycerol diacrylate; diglycerol tetramethacrylate; tetramethylene dimethacrylate; ethylene dimethacrylate; butyleneglycol dimethacylate; neopentylglycol diacrylate; and trimethylolpropane triacrylate. General reference is made to U.S. Pat. Nos. 3,041,322; 33,043,820; 3,046,262; 3,300,547; 3,425,988 and 3,435,012, incorporated herein by reference.

Suitable anaerobic sealant compositions may also contain a higher proportion of monofunctional acrylate esters (esters containing one acrylate group) than is typically found with anaerobic adhesives or impregnation compositions. Preferably the monofunctional esters are those with a relatively polar alcoholic moiety. Typical examples of compounds within this category are 3-phenyl propyl methacrylate; cyclohexylmethacrylate; tetrahydrofurfuryl methacrylate; hydroxethyl acrylate; hydroxypropyl methacrylate; t-butylaminoethyl methacrylate; cyanoethylacrylate and chloroethyl methacrylate.

Particularly suitable anaerobic compositions are described in European Patent Application EP 0,140,006 A2, incorporated herein by reference, of Dr. Gerhard Piestert which relates to sealants comprising polymerisable monomer components, a permanent adhesive substance and an initiator system. The monomer components have a low proportion of polyfunctional acrylate esters, up to 20% by weight of the total composition, while the remainder of the monomer components comprises one or more monofunctional acrylate esters. The monofunctional acrylate ester preferably comprises 10%-89% by weight of the composition, more particularly 19%-35% by weight, while the polyfunctional acrylate ester preferably comprises 1%-10% by weight of the composition. The permanent adhesive substance, which is dissolved in the monomers, and which may be present in an amount from 10 to 80% by weight, preferably 35 to 60% by weight, of the total composition, preferably comprises a polyacrylate such as the poly(butyl acrylate) which is commercially available from BASF (Badische Anilin- & Soda-Fabrik AG) under the Trademark ACRONAL 4F. This polyacrylate, which is of relatively low molecular weight, is fluid at room temperature; as a 50% solution in ethyl acetate it has a viscosity at 20° C. (according to DIN53211, 4 mm orifice) of 40-60 secs, and behaves as a polymeric plasticiser.

Another class of polyacrylate ester monomers utilized in anaerobic sealant compositions are the isocyanate monoacrylate reaction products described in U.S. Pat. No. 3,424,988 of Toback and Gorman, issued 4th Feb. 1969, incorporated herein by reference.

In addition to the monomers and (where appropriate) plasticiser, an anaerobic composition normally contains an initiator (particularly a peroxy compound), and an accelerator (particularly an amine) and a stabilizer. General reference is made to British Patent GB 1,422,439, incorporated herein by reference. Other ingredients which are also conventionally added to anaerobic sealant compositions such as plasticisers and pigments may also be present. In the composition of the present invention, a plasticiser or extender of the kind described in EP 0,140,006 A2 which is a low molecular weight viscous liquid is preferably present.

The anaerobic sealant composition of the present invention may be prepared by any of the known methods in the art.

DESCRIPTION OF THE PREFERRED EMBODIMENTS

The invention is illustrated in the following Examples.

EXAMPLE 1

An anaerobic sealant composition (hereafter called "Y") was made up as follows:

|  | % W/W |
| --- | --- |
| Methacrylate monomer A | 27.0 |
| Methacrylate monomer B | 3.0 |
| Plasticizer (ACRONAL 4F) | 56.0 |
| Cumene Hydroperoxide (90%) | 1.0 |
| Saccharin | 1.0 |
| 1,2,3,4-Tetrahydro quinoline | 0.5 |
| Stabilizer | 1.0 |
| Pigment | 0.5 |
| Particulate filler | 9.5 |
| Dry Aramid fibre pulp | 0.5 |

The methacrylate monomers A and B were 3-Phenylpropyl -methacrylate and ethylene glycol dimethacrylate respectively.

The plasticiser was ACRONAL 4F from BASF which has been described above.

The stabiliser was 2% 1,4-Naphthoquinone in polyethylene dimethacrylate.

The pigment was titanium dioxide paste in polyester commercially available from Pigment Dispersions Inc., N.J., U.S.A. as PDI 1100. The particulate filler was equal parts of fumed silicon dioxide and micronized polyethylene.

The aramid fibre pulp was obtained from E. I. Du Pont de Nemours & Co. Inc. Under the Trademark KEVLAR Merge 6F128 Dry Pulp.

According to published Du Pont information it has the following properties:

|  | Dry Pulp Merge 6F218 |
| --- | --- |
| +14 Mesh | 4 ± 2 |
| −13 + 30 Mesh | 17 ± 3 |
| −30 + 50 Mesh | 33 ± 5 |
| −50 + 100 Mesh | 26 ± 2 |
| −100 Mesh | 20 ± 4 |
| Canadian Std. Freeness | 300–425 |
| Nominal Average Length | Approx. 2 mm |
| BET Surface Area, m$^2$/g | 10 |
| Moisture, % | 4–7 |
| Bulk Density, lbs/cu. ft. | 9 |

A similar composition (hereafter called "Z") was made up with 2% w/w aramid fibre pulp. A similar composition without any aramid fibre pulp (hereafter called "X") was used for comparative purposes.

The compositions prepared as above were used in pipe sealing tests on 0.75 inch (19 mm) mildsteel threaded pip fittings. The liquid composition was applied to the male fittings in conventional manner, and the male fitting was then screwed into the female fitting, as a result of which the curing of the anaerobic composition was initiated. Each of the compositions cured to an elastic-plastic consistency, somewhat similar to chewing gum.

Air pressure was applied to the joint, which was held in a reservoir of water. The pressure was held for approximately 1 minute and observations were made as to whether any air bubbles escaped from the joint into the water. Two series of tests were carried out, one series immediately after assembly of the fittings and the second series 1 hour after assembly of the fittings. The results are set out below:

| Formulation | Time to Test | Result |
|---|---|---|
| X | Immediate | Failure at less than 1 Bar |
| Y | Immediate | 4 out of 6 samples passed at 2 Bar |
| Z | Immediate | 5 out of 6 samples passed at 2 Bar+ |
| X | 1 hour | Failure at 2 Bar |
| Y | 1 hour | All samples passed at 6 Bar |
| Z | 1 hour | All samples passed at 6 Bar |

+One sample failed due to a loose fitting.
1 Bar = 0.1 MPa.

All of the joints remained adjustable for 24 hours after assembly. In the case of compositions Y and Z, the seal was re-established immediately after adjustment.

EXAMPLE 2

In order to demonstrate that the improvement in sealing capability as a result of adding fibre pulp was not due to an increase in thickening of the composition, the following further compositions having a viscosity of the order of 200,000 mPa.s were prepared. Composition A was similar to composition Y but it contained no Aramid fibre pulp. The quantity of filler was increased by about 1% w/w as compared to composition Y. This composition had a viscosity of 184,000 mPa.s.

Composition B was also similar to Composition Y but the particulate filler was omitted and the quantity of dry Aramid fibre pulp was increased to 1.5% w/w. This composition had a viscosity of 204,000 mPa,s, It was relatively difficult to handle because of dryness.

Composition Y has a viscosity of 184,000 mPa.s. For experimental purposes, viscosities of 184,000 mPa.s and 204,000 mPa.s are regarded as similar.

Sealing capability was tested using a laboratory rig with a set fixed gap, rather than a threaded fitting which may have a variation in the gap which the product has to seal. The laboratory rig consists of an aluminum base with a flat circular flange having 100 mm outside diameter and a flange width of 10 mm. Each composition was applied to this flange face and the seal was completed by a flat glass plate which was placed over the flange and clamped at a gap of 0.125 mm.

A pressure of 1.5 p.s.i. over atmospheric was applied inside the rig and the time taken for the leak path to develop after assembly of the rig (i.e. clamping of the flat glass plate) was determined by observation through the glass.

The results were as follows:

| Composition | Time to Leak | |
|---|---|---|
| | Test 1 | Test 2 |
| A | 20 seconds | 15 seconds |
| B | 50 seconds | 55 seconds |
| Y | | 70 seconds |

Comparison of compositions B and Y against Composition A shows the advantage achieved by addition of the fibre pulp in compositions of similar viscosity.

We claim:

1. An improved anaerobically curable liquid (meth)acrylate ester sealant composition wherein the improvement comprises employing therein from about 0.1 to about 5% by weight of a fibrillated fibrous filler having a bulk density of less than about 25 lb. per cubic foot.

2. The improved anaerobic sealant composition of claim 1 wherein the fibrous filler has a bulk density of less than about 20 lb. per cubic foot.

3. The improved anaerobic sealant composition of claim 1 wherein the fibrous filler is present in an amount of from about 0.2 to about 2% by weight of the composition.

4. The improved anaerobic sealant composition of claim 1 wherein the fibrous filler is present in an amount of from about 0.25 to about 1% by weight of the composition.

5. The improved anaerobic sealant composition of claim 1 wherein the fibrous filler is a polymeric fibre.

6. The improved anaerobic sealant composition of claim 5 wherein the polymeric fibre is selected from the group consisting of fibrillated polyethylene fibres, fibrillated aramid fibres, and mixtures of the foregoing.

7. The anaerobic sealant composition of claim 5 wherein the fibres have a diameter in the range of about 1 to about 100 micrometres and an average length in the range of about 0.5 to about 5 millimetres.

8. A composition according to claim 1 wherein the anaerobic composition is based on a mixture of polymerizable acrylate ester monomers having a low proportion of polyfunctional acrylate ester, up to 20% by weight of the total composition, while the remainder of the monomer components comprises one or more monofunctional acrylate esters.

9. A composition according to claim 8 wherein a plasticiser is present in an amount from 10 to 80% by weight of the total composition.

10. An improved anaerobically curable liquid (meth-)acrylate ester sealant composition wherein the improvement comprises employing therein an effective amount of a fibrillated fibre so as to render said anaerobic sealant composition less susceptible to leaks, prior to cure, than are found with anaerobic sealant composition of like viscosity but without said fibrillated fibre.

11. The improved anaerobic sealant of claim 10 wherein the fibre is a polymeric fibre selected from the group consisting of fibrillated aramid fibre, fibrillated polyethylene fibre and mixtures of the foregoing.

12. The improved anaerobic sealant composition of claim 11 wherein the fibre comprises from about 0.1 to about 5% by weight of the composition.

13. The improved anaerobic sealant composition of claim 11 wherein the fibre comprises from about 0.25 to about 1% by weight of the composition.

14. The anaerobic sealant composition of claim 10 wherein the fibres have a diameter in the range of about 1 to about 100 micrometres and an average length in the range of about 0.5 to about 5 millimetres.

15. A composition according to claim 14 wherein the anaerobic composition is based on a mixture of polymerizable acrylate ester monomers having a low proportion of polyfunctional acrylate ester, up to 20% by weight of the total composition, while the remainder of the monomer components comprises one or more monofunctional acrylate esters.

16. A composition according to claim 15 wherein a plasticiser is present in an amount from 10 to 80% by weight of the total composition.

17. The improved anaerobically curable liquid (meth)acrylate ester sealant composition of claim 1, wherein one or more particulate fillers are present in a weight ratio of from about 6:1 to 40:1, relative to the amount of fibrillated fibre present.

18. A composition according to claim 17, wherein one or more particulate fillers are present in a weight ratio of from about 12:1 to 25:1, relative to the amount of fibrillated fibre present.

* * * * *